US010428573B2

(12) United States Patent
Rebree et al.

(10) Patent No.: US 10,428,573 B2
(45) Date of Patent: Oct. 1, 2019

(54) STIFFENING ADD-ON PROFILE FOR WINDOW FRAME AND WINDOW FRAME COMPRISING SAME

(71) Applicant: Deceuninck NV, Roeselare (BE)

(72) Inventors: Koen Rebree, Roeselare (BE); Peter DeGrande, Roeselare (BE)

(73) Assignee: Deceuninck NV, Roeselare (BE)

( * ) Notice: Subject to any disclaimer, the term of this patent is extended or adjusted under 35 U.S.C. 154(b) by 0 days.

(21) Appl. No.: 15/106,303

(22) PCT Filed: Dec. 17, 2014

(86) PCT No.: PCT/EP2014/078292
§ 371 (c)(1),
(2) Date: Jun. 19, 2016

(87) PCT Pub. No.: WO2015/091686
PCT Pub. Date: Jun. 25, 2015

(65) Prior Publication Data
US 2017/0030139 A1 Feb. 2, 2017

(30) Foreign Application Priority Data

Dec. 19, 2013 (EP) .................................... 13198515

(51) Int. Cl.
E06B 3/54 (2006.01)
E06B 3/22 (2006.01)
(Continued)

(52) U.S. Cl.
CPC .............. *E06B 3/5409* (2013.01); *B32B 7/08* (2013.01); *B32B 27/20* (2013.01); *B32B 27/304* (2013.01);
(Continued)

(58) Field of Classification Search
CPC ........ E06B 3/5409; E06B 3/222; E06B 3/221; B32B 27/20; B32B 7/08; B32B 27/304
(Continued)

(56) References Cited

U.S. PATENT DOCUMENTS 3,016,993 A * 1/1962 Owen ..................... E06B 1/045
52/204.591
3,024,881 A * 3/1962 Haas ................... E06B 3/26301
52/204.593
(Continued)

FOREIGN PATENT DOCUMENTS

DE 3628753 2/1987
DE 199 25 495 12/2000
(Continued)

*Primary Examiner* — Brian E Glessner
*Assistant Examiner* — Adam G Barlow
(74) *Attorney, Agent, or Firm* — Levy & Grandinetti

(57) ABSTRACT

A construction profile is made of polymeric material and defines an inner cavity. The construction profile has an outer surface comprising unexposed side portions and exposed side portions. A stiffening profile is provided external of the construction profile and at an unexposed side portion thereof. The stiffening profile has a polymer material and a reenforcement material. The stiffening profile has a tensile (flexural) modulus in its length (L) direction of at least 5 Gpa according to EN2561 and the polymer material has a lambda value of maximum 2 W/mK.

16 Claims, 5 Drawing Sheets

(51) Int. Cl.
*B32B 7/08* (2019.01)
*B32B 27/20* (2006.01)
*B32B 27/30* (2006.01)

(52) U.S. Cl.
CPC .............. *E06B 3/221* (2013.01); *E06B 3/222* (2013.01); *B32B 2307/546* (2013.01); *B32B 2419/00* (2013.01)

(58) Field of Classification Search
USPC ............. 52/204.591; 49/DIG. 1, DIG. 2, 504
See application file for complete search history.

(56) References Cited

U.S. PATENT DOCUMENTS

| | | | | |
|---|---|---|---|---|
| 4,873,806 | A * | 10/1989 | Jeschke | .................. E04B 2/962 52/235 |
| 6,715,248 | B2 * | 4/2004 | Biebuyck | .................. E04B 2/96 52/204.53 |
| 8,286,396 | B2 * | 10/2012 | Brunnhofer | ......... E06B 3/26303 49/501 |
| 2004/0219357 | A1 | 11/2004 | Van Dijk et al. | |
| 2011/0011006 | A1 * | 1/2011 | Wuest | ..................... E06B 3/221 49/506 |

FOREIGN PATENT DOCUMENTS

| | | | | |
|---|---|---|---|---|
| DE | 199 56 441 | | 5/2001 | |
| DE | 102005021934 | | 11/2006 | |
| DE | 102008015102 | | 10/2009 | |
| EP | 1 164 248 | | 12/2001 | |
| EP | 1 288 426 | | 3/2003 | |
| EP | 1 318 264 | | 6/2003 | |
| EP | 1318264 | A2 * | 6/2003 | ........... E06B 3/5409 |
| EP | 202005004616 | | 4/2006 | |
| EP | 1 911 923 | | 4/2008 | |
| EP | 2 052 125 | | 4/2009 | |
| EP | 2735687 | A1 * | 5/2014 | ........... E06B 3/221 |
| FR | 2 725 753 | | 4/1996 | |
| WO | WO 2008019669 | | 2/2008 | |
| WO | WO 2010049532 | | 5/2010 | |

\* cited by examiner

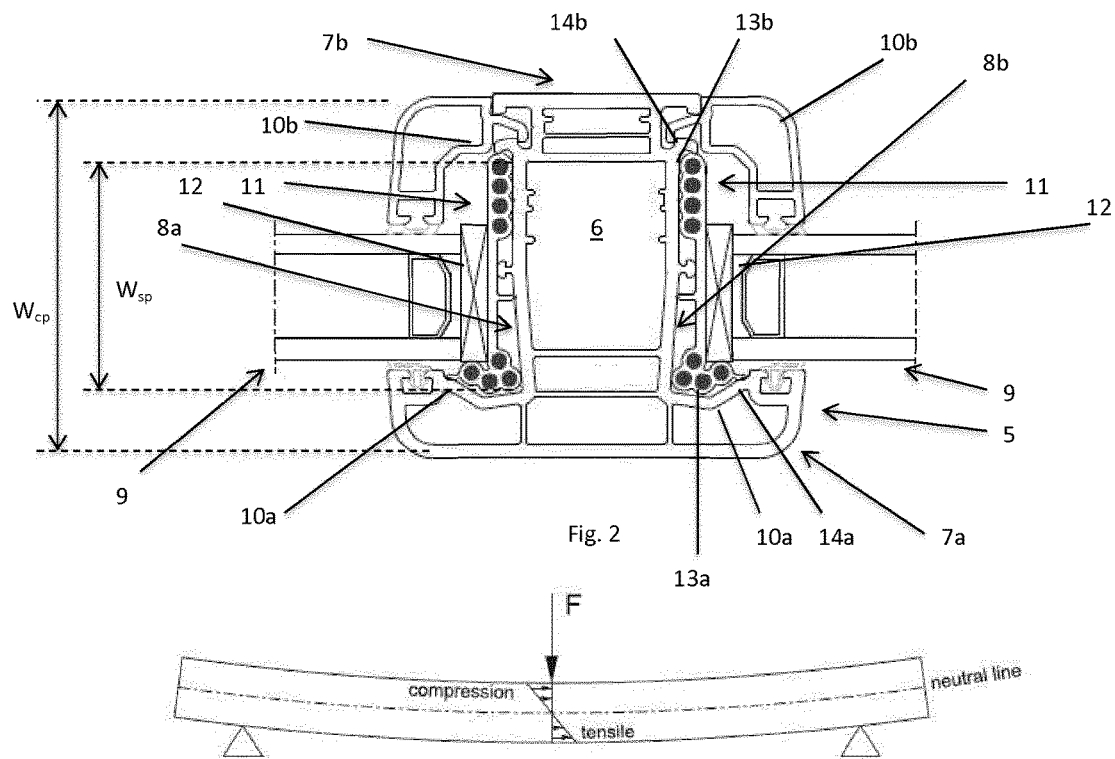
Fig. 2
Fig. 3
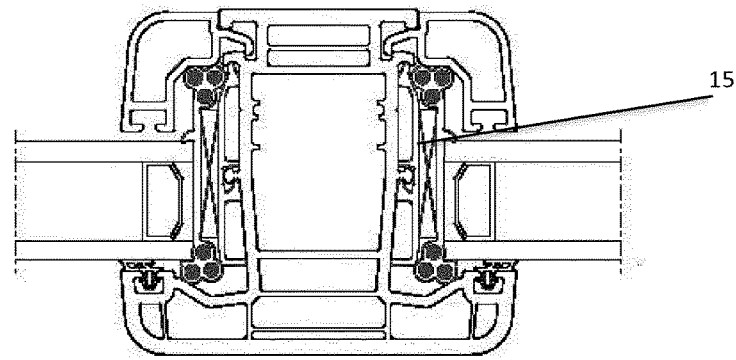
Fig. 4

STIFFENING ADD-ON PROFILE FOR WINDOW FRAME AND WINDOW FRAME COMPRISING SAME

TECHNICAL FIELD

The present invention concerns polymeric window profiles having good mechanical and thermal properties. In particular, it concerns a stiffening add-on member that when provided on a profile does not or only very limited influence thermal properties of the profile.

BACKGROUND OF THE INVENTION

Profiles for windows and doors need to meet high mechanical requirements to withstand side forces applied on the door or window by for example wind and have high thermal insulation requirements in for preventing energy losses through a window or door frame made of these profiles.

For large glass areas or for applications exposed to wind or windows being mounted non-vertically, the mechanical properties of frames made of thermoplastic profiles can be insufficient. For this reason, polymeric profiles often comprise a stiffening chamber for accommodating a stiffening member, such as a ceramic or metal profile as disclosed e.g., in DE102008015102, DE19925495, DE202005004616, or a foam such as in DE102005021934. Such solutions have a number of drawbacks. First, a metal stiffening profile inserted into a stiffening chamber of the polymeric frame forms a thermal bridge which is detrimental to the thermal insulation properties of the frame. Second, inserting such stiffening profiles is extremely labour intensive which weighs heavily on the production cost of the frame. Third, the shape of the stiffening chamber may differ from one model of polymeric profile to another, requiring complex storage management of stiffening profiles of different geometries.

In order to solve some of the above problems, it has been proposed to reinforce window frames with an external reinforcement add-on coupled to an external, visually apparent surface of the window frame. This solution has an obvious aesthetic drawback that few consumers are ready to accept. An example is disclosed in DE102005021934 wherein an external metal profile is clipped to a polymeric frame.

Polymeric window and door frame profiles typically have one or more finished outer side surface portions and one or more technical outer side surface portions, whereby the finished side surface portions are those that are exposed, i.e. visible, when the window or door is installed, while the technical side surface portions are facing a wall, other profile or pane of the door or window and hence are not exposed, not visible, when the window or door is installed. These technical side surface portions usually comprise a more complex structure of brackets and guides for accommodating window or door hardware.

The technical side surface portion of a window sash profile facing a glass pane usually comprises two opposite brackets extending in a longitudinal direction of the profile. A multitude of designs is available on the market, but usually one bracket is an integral part of the sash profile, forming a ledge on which to lay a window pane before clamping it by clipping in place the second bracket. A drainage zone in the form of a channel extending along said longitudinal direction is created between, on the one hand, said pair of clamping brackets and, on the other hand, the edge of the pane and the adjacent external surface of the frame comprised between said pair of brackets. Said channel is often used to accommodate an insert. For example in EP1288426 an insert is used to support and hold a security glass pane in a window or door frame. Similarly, DE102005021934, DE19956441, EP1164248, FR2725753 and EP2052125 disclose a support insert positioned in such channel to hold the glass pane in place. EP1911923 discloses an insert improving (decreasing) the thermal conductivity of a window frame.

The present invention provides a solution for stiffening a polymeric frame profile for a window or door obviating the above mentioned problems. In particular, a stiffing profile is presented which has no detrimental effect on the thermal insulate properties of the profile and which is aesthetically acceptable for the consumer in that it is not or hardly visible from the exterior of a closed and installed door or window. The stiffening profile can be applied in plant or in situ, even after the various profiles are cut and welded to form a frame for a given application, and it can be applied where reinforcement is needed only. Furthermore it is very cost effective. This and other advantages of the present invention are presented in continuation.

SUMMARY OF THE INVENTION

The present invention is defined in the appended independent claims. Preferred embodiments are defined in the dependent claims. In particular, the present invention concerns a construction profile made of polymeric material and defining an inner cavity, the construction profile having an outer surface comprising unexposed side portions and exposed side portions, whereby a stiffening profile is provided external of said construction profile and at an unexposed side portion thereof, characterised in that said stiffening profile comprises a polymer material and a reinforcement material, the stiffening profile having a tensile (flexural) modulus in its length (L) direction of at least 5 GPa according to EN2561 and the polymer material having a lambda value of maximum 2 W/mK.

The present invention also concerns a stiffening add-on profile comprising at least two longitudinal reinforced edges extending parallel one to another and being connected by a web of a polymeric material, said edges each having a tensile modulus in the longitudinal direction of at least 5 GPa according to EN2561 and the polymeric material of the web having a lambda value of maximum 2 W/mK.

The present invention further concerns a kit-in-part of:
- a construction profile made of polymeric material and defining an inner cavity, the construction profile having an outer surface comprising unexposed side portions and exposed side portions;
- a stiffening profile having a length (L) larger than its width (W), said width (W) being larger than its thickness (H), the stiffening profile having a tensile (flexural) modulus in the length (L) direction of at least 5 GPa according to EN2561 and the polymeric material of the web having a lambda value of maximum 2 W/mK, wherein said stiffening profile and construction profile are designed such that the stiffening profile can be fixed at an unexposed side portion of said construction profile.

DESCRIPTION OF THE INVENTION

The construction profile and stiffening profile are preferably designed such as to allow releasably fixing the stiffening profile at an unexposed side portion of the construction profile, such as for example fixation by clamping, by snap fit and/or by screws.

In order to further improve the thermal stability of a polymeric construction profile it is preferred that the stiffening profile has a linear thermal expansion coefficient of maximum $25.10^6$ mm/mm/K, more preferably maximum $20.10^6$ mm/mm/K and most preferably maximum $15.10^6$ mm/mm/K. The term linear thermal expansion coefficient (CLTE) indicates the change of length of the stiffening profile for each incremental change in temperature as given by the formula:

$$\alpha = dl/(l0*dT),$$

where:
dl=change in length of the profile in the direction being measured (longitudinal direction);
l0=initial length of the stiffening profile in the direction being measured (longitudinal direction) and;
dT=the change in temperature over which dl is measured.
Coefficients of linear thermal expansion can be measured by techniques known to a person skilled in the art, such as with a silica dilatometer according to ASTM D 696 or ISO 1 1359. The, in comparison with the CLTE of PVC, low CLTE values of the stiffening profile are specifically advantageous for use with construction profiles in applications where high dimensional stability of the construction profiles is desired such as when the profiles are exposed to changing weather conditions as is the case for door and window profiles, gates, fences, siding and decking.

The stiffening profile preferably has a tensile modulus in the longitudinal direction of at least 8 GPa, preferably at least 10 GPa. The tensile modulus of the stiffening profile can be measured according to EN2561. The relatively high tensile modulus of the stiffening profile allows to reinforce a existing PVC window profiles to achieve a high rigidity for a width variety of window profile geometries without the need or with limited need for other reinforcements in the construction profile. The rigidity is approximately equal to E*I,
where
E=the tensile modulus of the stiffening profile (N/mm$^2$) and;
I=the inertion moment of the window profile (geometry dependent) (mm$^4$).

Preferably the polymeric material of the web of said stiffening profile has a lambda value of maximum 1 W/mK, preferably maximum 0.5 W/mK, most preferably maximum 0.25 W/mK. As these values are much lower than the lambda values of steel or aluminium and are comparable to the lambda values of polymeric materials, use of the stiffening profile has no detrimental effect on the thermal insulation properties of the PVC profile.

According to a preferred embodiment, a lip of elastic material is provided on said stiffening profile on the side thereof facing away from the construction profile on which the stiffening profile is provided. When providing such stiffening profile on a sash profile in between the sash profile and an adjacent edge of a pane clamped in the sash profile, the lip will contact the edge of the pane and thereby divide the space between the outer unexposed surface of the sash profile and the adjacent edge of the pane in two compartments, thereby improving thermal insulation properties of the sash as a whole.

In a preferred embodiment, the stiffening profile comprises at least two longitudinal reinforced edges extending parallel one to another and being connected by a web of a polymeric material, said edges each having a tensile modulus in the longitudinal direction of at least 5 GPa according to EN2561 and the polymeric material of the web having a lambda value of maximum 2 W/mK. The reinforced edges preferably comprise a reinforcement material embedded in a matrix of polymeric material, whereby the reinforced material is selected from the group of: metal rods, metal wires, metal cables, glass fibres, aramid fibres, carbon fibres, continuous natural fibers and mixtures thereof. The web is preferably manufactured in a polymeric material comprising a polymer or copolymer selected from the group of: polyvinyl chloride (PVC); acrylonitrile-butadiene-styrene (ABS); styrene acrylonitrile (SAN); polymethylmetharcrylate (PMMA); high density polyethylene (HDPE); polypropylene (PP); a polyamide, such as PA6, PA6.6, PA10, PA11 or PA12; polyethylene terephthalate (PET); polyoxymethylene (POM) and mixtures thereof.

The construction profile with stiffening profile provided thereon is particularly advantageous for use as window or door profiles such as a sash profile, a frame profile, a transom profile, a coupling profile.

BRIEF DESCRIPTION OF THE DRAWINGS

For a fuller understanding of the nature of the present invention, reference is made to the following detailed description taken in conjunction with the accompanying drawings in which:

FIG. 1b represents a perspective view of the stiffening profile of FIG. 1a;

FIG. 2 represents a cross-section of a window transom profile reinforced with a stiffening profile according to the present invention;

FIG. 3 schematically shows the stress distribution across the thickness of a construction profile strained in three point bending mode;

FIGS. 4, 5a and 5b represent a same view as FIG. 2 of another alternative embodiment of the present invention;

DETAILED DESCRIPTION OF THE INVENTION

Figure 1A:
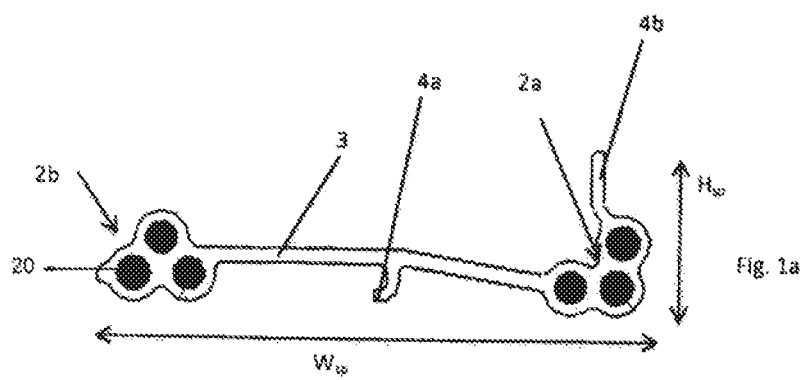
FIG. 1a represents a cross-section of a preferred embodiment of a stiffening profile according to the present invention.
Figure 1B:
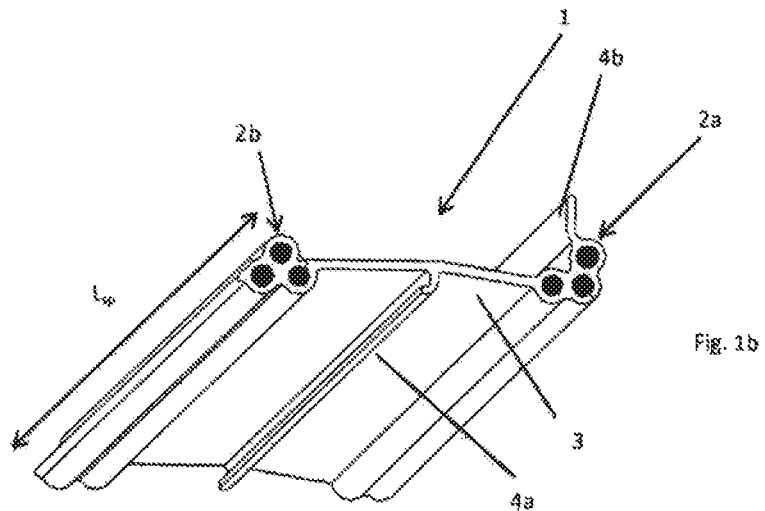

FIGS. 1a & 1b represent a preferred embodiment of a stiffening add-on profile 1 according to the present invention, said stiffening add-on profile comprising two longitudinal reinforced edges 2a and 2b extending parallel one to another and being connected by a web 3 of a polymeric material, said edges 2a and 2b each having a tensile modulus in the longitudinal direction L of at least 5 GPa according to EN2561 and the polymeric material of the web 3 having a lambda value of maximum 2 W/mK. The stiffening profile 1 has a length $L_{sp}$, a width $W_{sp}$ in this case corresponding to the distance from one reinforced edge to the other and a thickness $H_{sp}$, whereby the length is preferably determined by the length of a construction profile whereon the stiffening profile is intended to be fixed, whereas the width $W_{sp}$ can vary from 10 mm up to 200 mm depending on the geometry of the construction profile whereon the stiffening profile is to be fixed, the ratio of the width W of the stiffening profile over the width $W_s$ of the corresponding construction profile is preferably comprised between 0.5 and 1. The thickness $H_{sp}$ of the stiffening profile is preferably less than 20 mm, more preferably less than 15 mm. In the embodiment represented in FIG. 1, the stiffening profile further comprises support lips 4a, 4b transverse to the width and length of the stiffening profile extending along the longitudinal direction L.

The polymeric material of the web preferably comprises a polymer or copolymer selected from the group of: polyvinyl chloride (PVC); acrylonitrile-butadiene-styrene (ABS); styrene acrylonitrile (SAN); polymethylmetharcrylate (PMMA); high density polyethylene (HDPE); polypropylene (PP); a polyamide, such as PA6, PA6.6, PA10, PA11 or PA12; polyethylene terephthalate (PET); polyoxymethylene (POM) and mixtures thereof, whereby PVC is most preferable. Apart from the above polymer, the polymeric material may comprise fillers, such as talc or glass fibres, and/or colorants. The polymeric material of the web has a lambda value of maximum 2 W/mK, preferably maximum 1 W/mK, more preferably maximum 0.5 W/mK, most preferably maximum 0.25 W/mK.

According to the preferred embodiment of FIGS. 1a and 1b, the reinforcement material 20 is present in two distinct longitudinal zones, i.e., edges of the stiffening profile and is locally embedded in the polymer material that defines the web 3 extending between the above two distinct reinforcement zones 2a and 2b. As such thermal insulation properties of the stiffening profile in the width Wsp are predominantly determined by the material in which the web 3 is manufactured. The reinforcement material further preferably has a linear thermal expansion coefficient (CLTE) of maximum $25 \cdot 10^6$ mm/mm/K, more preferably maximum $20 \cdot 10^6$ mm/mm/K, and most preferably maximum $15 \cdot 10^6$ mm/mm/K. As the reinforcement material is embedded in the polymer material of the web, the CLTE of the reinforcement material will predominantly determine the CTLE of the stiffening profile as a whole since the CTLE of the polymer web material will in most cases be readily above the CTLE values of the reinforcing material. Further, the reinforced edge must have a tensile (flexural) modulus in the length (L) direction of at least 5 GPa according to EN2561, more preferably of at least 8 GPa, even more preferably at least 10 GPa or at least 20 GPa and most preferably at least 30 GPa to at least 35 GPa. Moduli up to 60 GPa can be achieved with, e.g., carbon fibres as reinforcement material. For example, the reinforcement material can be in the form of metal rods, wires or cables, such as steel. A rod designates herein a bulk metal piece whilst a wire is either a 'thin' rod or a bundle of metal strands. A cable is a bundle of intertwined metal strands. The reinforcement material can also be glass fibres, carbon fibres, aramid fibres or continuous natural fibres. Such fibres usually have a low diameter of the order of 10 to 20 micrometers gathered in bundles of 3000 to 20,000 fibres and more. Impregnation of such tight bundles of fibres by a thermoplastic polymer generally characterised by a high melt viscosity can result problematic. It is possible due to so called prepregs or tow-pregs, wherein the fibres are already impregnated by a polymer (thermoplastic or thermoset precursor), or are intimately mingled with the matrix present in the form of polymer powder (called powder impregnated tows), or polymer fibres (called commingled fibres). If fibre reinforced prepregs or tow-pregs are used as reinforcement material, it is highly preferred that the resin present in the fibre tows be compatible with the polymer material used for the web 3 to ensure excellent adhesion between the web and the reinforced edge portions 2a, 2b. The resin present in the fibre bundles is preferably the same or of the same family as the polymer used for manufacturing the web 3. In the embodiment depicted in FIGS. 1a and 1b, each reinforced edge 2a, 2b of the stiffening profile comprises three metal cables. However, this number can vary in accordance with the desired tensile strength of the stiffening profile. It is also possible to have a different number of cables in each of the reinforced edge portions.

A stiffening profile 1 according to the present invention can be produced by a combination of extrusion and pultrusion. The thermoplastic central web portion 3 of the profile is extruded, whilst the reinforcement material embedded in the thermoplastic polymer can be produced simultaneously and continuously out of the same die by pultrusion. The web of the profile can be reinforced by short fibres or other filler material, such as talc, but this is not mandatory, since the high stiffness is required at the edges only as will be discussed in continuation with respect to a window profile.

As illustrated in FIG. 2, the add-on stiffening profile 1 is used to reinforce a construction profile 5 according to the present invention. The construction profile is for example a polymeric profile for windows or doors and typically defines an inner cavity 6. Such construction profile comprises one or more finished outer side surface portions 7a, 7b and one or more technical outer side surface portions 8a, 8b, whereby the finished side surface portions 7a, 7b are those that are exposed, i.e. visible, when the window or door is installed and closed, while the technical side surface portions are facing a wall, other profile or pane of the door or window and hence are not exposed, not or hardly visible, when the window or door is installed and closed. These technical side surface portions 8a, 8b usually comprise a more complex structure of brackets and guides for accommodating window or door hardware.

The construction profile shown in FIG. 2 is a transom window profile 5 accommodating two panes, in particular glass panes 9 coupled to the window profile 5 along a longitudinal direction through a pair of clamping brackets 10a and 10b defining a drainage zone 11 in the form of a channel extending along said longitudinal direction and defined between, on the one hand, said pair of clamping brackets 10a and 10b and, on the other hand, the clamped edge 12 of the glass pane 9 and the outer surface portion (unexposed in finished state of the window) 8b of the transom profile defined between the pair of clamping brackets 10a and 10b. A stiffening add-on profile 1 as discussed supra is locked in place in said channel 11, with the width $W_{sp}$ of the stiffening profile 1 being oriented transversally, preferably normal to the plane defined by the glass pane 9. Preferably, the first and second reinforced edge portions 2a and 2b extend beyond either sides of the glass thickness. By its position, the stiffening profile can also be used, as in prior art applications to help support the glass pane. But its prime function is strengthening the construction profile, by providing reinforcement having high stiffness where, and preferably only where, it is needed, thereby not or only slightly reducing the thermal insulation properties of the construction profile. The secondary function of the stiffening profile is limiting the linear thermal expansion of the construction profile.

Referring to FIG. 3, a beam, such as the construction profile 5, exposed to a flexural stress will bend and create a stress field as represented by the thin arrows: above the neutral plane of the beam (cf. dashed line), which is not under any stress, compressive stresses (arrows oriented to the centre) build up from said neutral plane increasingly until it reaches a maximum value in compression at the surface of the beam. On the other side of the neutral plane tensile stresses (arrows oriented from the centre to the right) build up increasingly until it reaches a maximum value at the surface of the beam. This is why reinforcing the central plane of a beam is useless if the beam is strained in flexure. This also explains why the central web 3 of the stiffening add-on profile 1 needs not to be reinforced with reinforcing material and that the ratio between the width $W_{cp}$ of the construction profile 5 and the width $W_{sp}$ of the stiffening profile 1, is preferably higher than 0.5 and even more preferably higher than 0.7, most preferably higher than 0.8 such that the reinforced edges are positioned close to the lateral side surfaces (in this case the exposed side surfaces 7a and 7b) of the construction profile to carry the bulk of the stresses generated by the bending of the window profile (due to e.g. wind). This is the reason why the stiffening profile comprises reinforced edge portions embedding reinforcement material, such as fibres, rods, cables or wires. Thus the construction profile having a add-on stiffening profile fixed thereon needs not to comprise a metal or other stiffening beam inserted in a inner cavity 6 of that construction profile, thus obviating all the drawbacks associated therewith.

Even if metal rods, cables or wires are used as a reinforcement material, no thermal bridge is formed across the width of the stiffening profile and consequently the width of the construction profile, since the rods, cables or wires extend longitudinally and the two reinforced portions 2a, 2b embedding them are separated from one another by the web 3 of the stiffening profile which acts as a thermal insulator. Another advantage is that the stiffening profile is not visible or at least not apparent after completing the mounting of the glass pane in the window frame.

The stiffening profile is preferably clipped, clamped, snap fitted or screwed in place onto the non-exposed surface portion of the construction profile. This can be done in plant, but advantageously made in situ, after the window profiles have been cut, and possibly, welded to the desired dimensions. In the embodiment of FIG. 2, a first bracket 10a is an integral part of the frame profile 5 protruding out of a wall thereof, forming a ledge on which a window pane can be laid prior to clipping the second bracket 10b into clamping position. Prior to lying the glass pane onto the first bracket 10a, the stiffening add-on profile is clipped into place in contact with said first bracket 10a and the outer surface 8b of the window profile 5. In this case the add-on stiffening profile 1 is held in place by the support lips 4a, 4b and the reinforced edge portions 2a, 2b cooperating with mating recesses 13a and 13b on two walls 14a and 14b of the channel 11. The glass pane 9 can thus be laid forming a third wall of the channel 11 which is then closed by the forth wall formed by the second clamping bracket 10b. This allows applying the stiffening profile 1 only in applications and on locations where strengthening of a construction profile and hence frame of profiles is required. If a large bay window is flanked by a window of smaller dimensions, the frame profiles of the bay window may require reinforcement but the frame of the window of smaller dimensions not. Such freedom to optimise the structure of a set of different windows is not granted to a glazier with the state of the art window frame profiles reinforced with a metal profile inserted in an inner cavity 6 of the profile 5. Furthermore, the stiffening profile of the present invention can be fixed on construction profiles having a large variety of geometries, since it cooperates with the technical outer surface of construction profiles designed for cooperation with (door or window) hardware and hence remains rather constant whatever the model of the construction frame.

In FIG. 4, an alternative embodiment of a construction profile and stiffening profile according to the present invention is depicted. In this case the stiffening profile is clipped on a side edge 12 of a pane, such as a glass pane, clamped between clamping brackets 10a and 10b of the construction profile 5. Clipping of the stiffening profile is realised through the support lips 4a, 4b of the stiffening profile that in this case protrude from a same surface of the web 3. The dimensions of the stiffening profile 1 are in this case such that the reinforced edge portions 2a and 2b extend beyond either sides of the pane thickness and are fixed to the construction profile by clamping brackets 10a and 10b clamping the pane, such that the stiffness profile is situated in the above mentioned channel 11. Optionally, a glass support insert 15 can be provided in the channel. Such glass support insert is known in the art and will not be described in further detail.

Figure 5A:
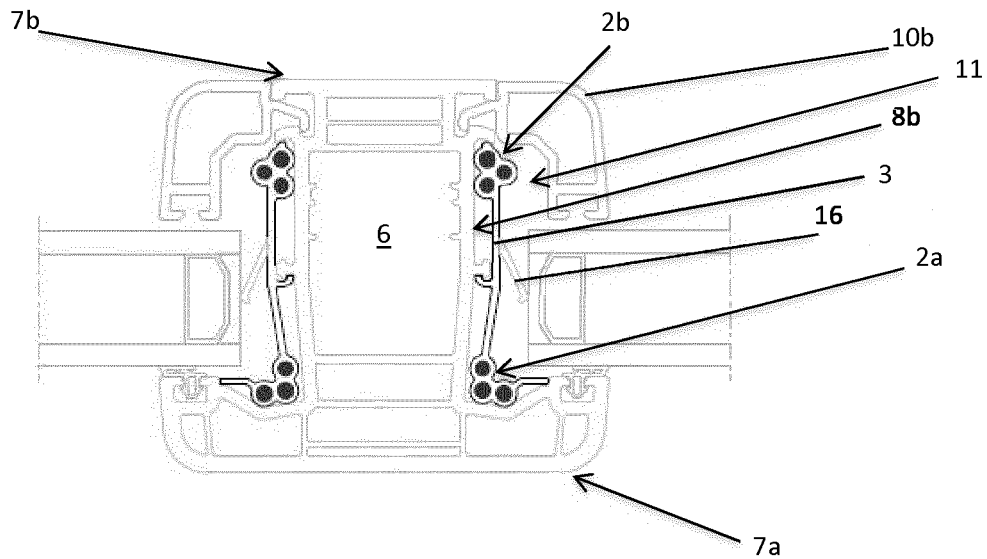
Figure 5B:
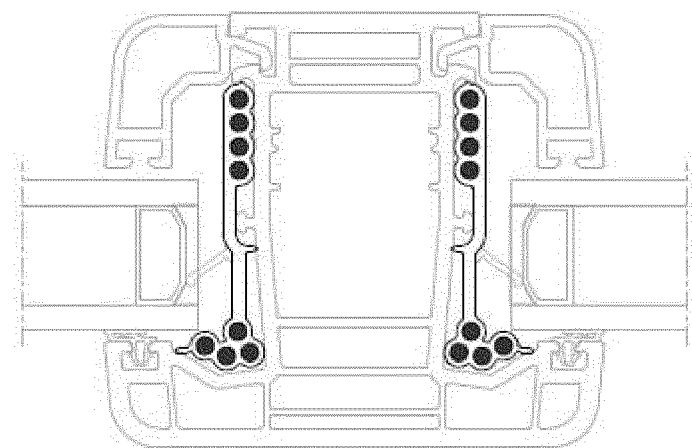

FIGS. 5a and 5b represent further alternative embodiments of a construction profile and stiffening profile according to the present invention. The stiffening profile 1 in this case comprises a lip 16 in a flexible material protruding from the web 3. When the stiffening profile is fixed in the channel 11 of the window profile 5, the lip protrudes in a direction of the clamped edge 12 of glass pane 9. The lip 16 preferably protrudes over a distance in the height direction of 10 mm to 20 mm such that when assembled the lip 16 contacts the clamped edge 12 of the glass pane 9. As such the space defined by, on the one hand, the pair of clamping brackets 10a and 10b and, on the other hand the stiffening profile and the clamped edge 12 of the glass pane 9, is divided in width direction in two compartment thereby improving thermal insulation properties in view of an continuous space. In FIG. 5a, the stiffening profile comprises reinforced edge portions 2a and 2b each comprising three steel wires, whereas in FIG. 5b, the stiffening profile 1 has reinforced edge portions 2a and 2b each comprising four steel wires.

Figure 6A:
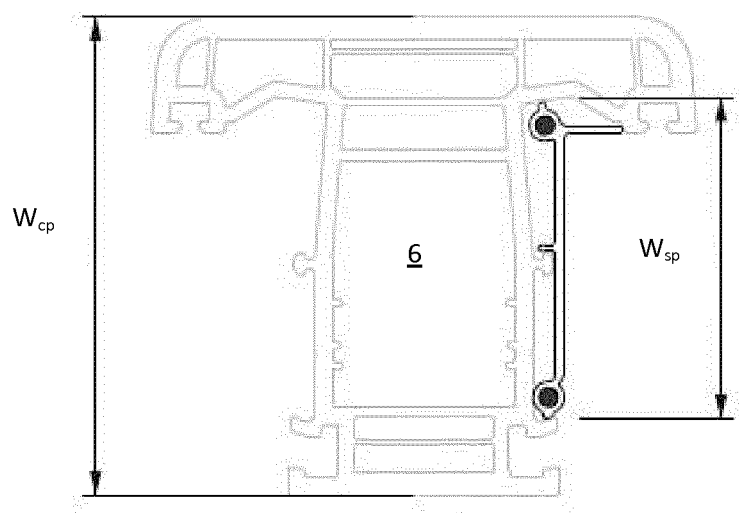
FIGS. 6a and 6b represent a cross section of alternative embodiments of a construction profile and stiffening profile according to the present invention.
Figure 6B:
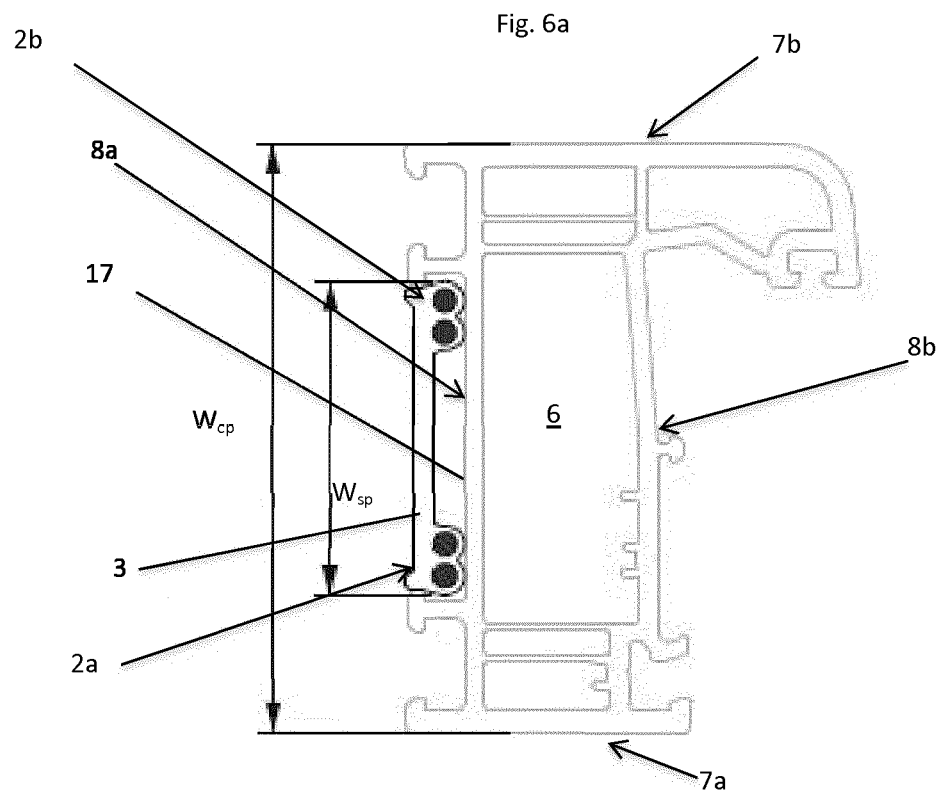

FIG. 6a represents two more alternative embodiments of the construction profile and stiffening profile according to the present invention. In FIG. 6a, the stiffening profile 1 is snap fitted to an outer surface portion 17 of the construction profile that is intended to face a wall when installed, which outer surface 17 is an unexposed surface portion of the construction profile according to the definition provided in this specification. In FIG. 6b, the stiffening profile essentially corresponds to the stiffening profile represented in FIG. 2, unless that the reinforced edge portions 2a and 2b each comprise only one steel wire instead of four.

Figure 7:
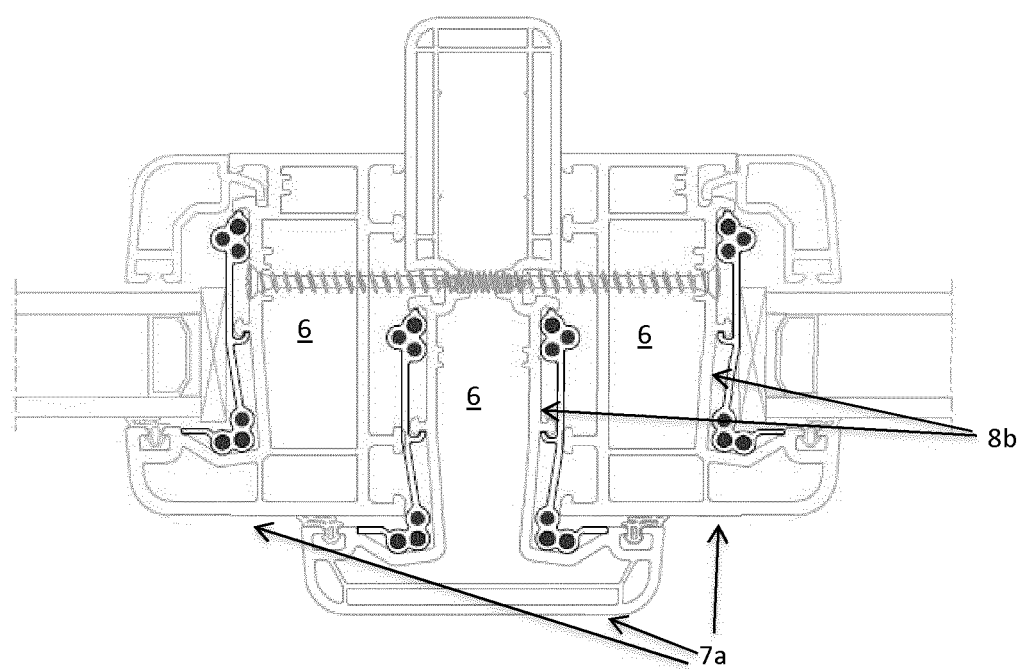
FIG. 7 represents a cross section of an assembly of a coupling profile and two frame profiles reinforced with stiffening profiles according to the present invention.

FIG. 7 shows an coupling profile 18 coupling two frame profiles 19. Each of these profiles is a construction profile and in this case each of these profiles is reinforced with a add-on stiffening profile according to the present invention. The stiffening profiles 1 reinforcing the coupling profile are in this case provided on a outer surface portion of that coupling profile that, in an assembled state is covered by the frame profiles. Hence this outer surface portion is an unexposed outer surface portion of the coupling profile.

According to yet another alternative, the stiffening add-on profile is manufactured from a polymer composition wherein a reinforcement material is dispersed. An example of such a reinforcement material is a mineral filler, whereby 'mineral' is defined as an element or chemical compound that is normally crystalline and that has been formed as a result of geological processes. Wood fibres are not mineral. Preferred mineral fillers comprise wollastonite, vermiculate, talc, mica and/or combinations thereof. The polymer composition is preferably highly filled with the mineral filler and comprises at least 25 weight parts of mineral filler per 100 weight parts of polymer, preferably PVC. Examples of the above polymer compositions with a mineral filler are provided for in WO2010049532 published on May 6, 2010.

The present invention provides a solution for stiffening a polymeric construction profile, such as door or window profiles, obviating the above mentioned problems associated with reinforced construction profiles according to the state of the art. In particular a stiffening is presented which has no detrimental effect on the thermal insulation properties of the construction profile and which is aesthetically acceptable for the consumer in that it is not or hardly visible for a consumer from the exterior of a closed and installed window or door.

The invention claimed is:

1. A window profile made of polymeric material and defining an inner cavity, the window profile having an outer surface comprising unexposed side portions, defined between a pair of clamping brackets defining a drainage zone, and exposed side portions,
   a stiffening profile is provided external of said window profile in said drainage zone, the stiffening profile comprising two distinct longitudinal reinforcement edges extending parallel one to another and being connected by a web of polymeric material,
   wherein said stiffening profile comprises a polymer material and a reinforcement material, the reinforcement material only present in the two distinct longitudinal reinforcement edges is selected from the group of metal rods, metal wires, metal cables, glass fibres, aramid fibres, carbon fibres, continuous natural fibres and mixtures thereof, and locally embedded in the polymer web,
   the stiffening profile having a tensile (flexural) modulus in its length (L) direction of at least 5 GPa according to EN2561 and the polymer material having a lambda value of maximum 2 W/mK.

2. The window profile according to claim 1, wherein said stiffening profile is releasably fixed to said window profile at a non-exposed side portion thereof.

3. The window profile according to claim 2, wherein said stiffening profile is fixed to the window profile by clamping or by a snap-fit.

4. The window profile according to claim 1, wherein said stiffening profile has a linear thermal expansion coefficient (CLTE) of maximum 25·10$^6$ mm/mm/K.

5. The window profile according to claim 1, wherein said stiffening profile has a tensile modulus in the longitudinal direction of at least 8 GPa.

6. The window profile according to claim 1, wherein said polymeric material of the stiffening profile has a lambda value of maximum 1 W/mK.

7. The window profile according to claim 1, wherein said stiffening profile comprises at least two longitudinal reinforced edges extending parallel one to another and being connected by a web of a polymeric material, said edges each having a tensile modulus in the longitudinal direction of at least 5 GPa according to EN2561 and the polymeric material of the web having a lambda value of maximum 2 W/mK.

8. The window profile according to claim 7, wherein said reinforced edges comprise a reinforcement material embedded in a matrix of polymeric material.

9. The window profile according to claim 8, wherein said reinforcement material is selected from the group of: metal rods, metal wires, metal cables, glass fibres, aramid fibres, carbon fibres, continuous natural fibres and mixtures thereof.

10. The window profile according to claim 7, wherein said web is manufactured in a polymeric material comprising a polymer or copolymer selected from the group of: polyvinyl chloride (PVC); acrylonitrile-butadiene-styrene (ABS); styrene acrylonitrile (SAN); polymethyl methacrylate (PMMA); high density polyethylene (HOPE); polypropylene (PP); a polyamide, such as PA6, PA6.6, PA10, PA11 or PA12; polyethylene terephthalate (PET); polyoxymethylene (POM) and mixtures thereof.

11. The window profile according to claim 1, wherein a lip of elastic material is provided on said stiffening profile on the side facing away from the window profile on which the stiffening profile is provided.

12. The window profile according to claim 1, wherein said window profile is a window or door profile.

13. The window profile according to claim 12, wherein said stiffening profile is provided in a channel extending longitudinally along said window of door profile, said channel being defined between, on the one hand, a pair of clamping brackets clamping a pane provided in the window or door and, on the other hand, the edge of said pane and the adjacent outer surface of the window or door profile comprised between said pair of brackets.

14. A stiffening add-on profile comprising at least two longitudinal reinforced edges extending parallel one to another and being connected by a web of a polymeric material, said edges each having a tensile modulus in the longitudinal direction of at least 5 GPa according to EN2561 and the polymeric material of the web having a lambda value of maximum 2 W/mK.

15. A kit in parts of:
   a construction profile window profile made of polymeric material and defining an inner cavity, the window profile having an outer surface comprising unexposed side portions and exposed side portions;
   a stiffening profile having a length (L) larger than its width (W), said width (W) being larger than its thickness (H), the stiffening profile having a tensile (flexural) modulus in the length (L) direction of at least 5 GPa according to EN2561 and the polymeric material of the web having a lambda value of maximum 2 W/mK,
   wherein said stiffening profile and window profile are designed such that the stiffening profile can be fixed at an unexposed side portion of said window profile, and
   the stiffening profile comprising two distinct longitudinal reinforcement edges extending parallel one to another and being connected by a web of polymeric material.

16. The window profile according to claim 1, wherein a lip of elastic material is provided on said stiffening profile on the side facing the window profile on which the stiffening profile is provided.

* * * * *